(12) United States Patent
Lee (10) Patent No.: US 8,532,010 B2
(45) Date of Patent: Sep. 10, 2013

(54) TRANSMISSION METHOD FOR UPLINK TRANSPORT LAYER

(75) Inventor: Jinsock Lee, Tokyo (JP)

(73) Assignee: NEC Corporation, Tokyo (JP)

( * ) Notice: Subject to any disclaimer, the term of this patent is extended or adjusted under 35 U.S.C. 154(b) by 1310 days.

(21) Appl. No.: 11/720,183

(22) PCT Filed: Nov. 25, 2005

(86) PCT No.: PCT/JP2005/021675
§ 371 (c)(1),
(2), (4) Date: May 24, 2007

(87) PCT Pub. No.: WO2006/057338
PCT Pub. Date: Jun. 1, 2006

(65) Prior Publication Data
US 2008/0008112 A1  Jan. 10, 2008

(30) Foreign Application Priority Data
Nov. 25, 2004  (JP) .................................. 2004-340509

(51) Int. Cl.
H04H 20/71  (2008.01)

(52) U.S. Cl.
USPC ............................ 370/312; 370/328; 455/403

(58) Field of Classification Search
USPC .................................. 370/312, 328; 455/403
See application file for complete search history.

(56) References Cited

U.S. PATENT DOCUMENTS

| | | | | |
|---|---|---|---|---|
| 7,668,138 B2 * | 2/2010 | Abedi | ............................ | 370/331 |
| 2001/0023191 A1 * | 9/2001 | Endo | ............................ | 455/560 |
| 2002/0159482 A1 * | 10/2002 | Hans et al. | .................... | 370/493 |
| 2003/0224786 A1 * | 12/2003 | Lee et al. | .................... | 455/432.1 |
| 2005/0243831 A1 * | 11/2005 | Zhang et al. | .................. | 370/394 |
| 2005/0276249 A1 * | 12/2005 | Damnjanovic et al. | ....... | 370/335 |

FOREIGN PATENT DOCUMENTS

| | | |
|---|---|---|
| CN | 1463085 A | 12/2003 |
| CN | 1533056 A | 9/2004 |
| JP | 08-139736 A | 5/1996 |
| JP | 09-508773 A | 9/1997 |
| JP | 2000-151712 A | 5/2000 |
| JP | 2001-238242 A | 8/2001 |

(Continued)

OTHER PUBLICATIONS

3GPP TS 25.309 V6.0.0 (Sep. 2009), Technical Specification $3^{rd}$ Generation Partnership Project; Technical Specification Group Radio Access Network; FDD Enhanced Uplink; Overall description; Stage 2 (Release 6).

3GPP TR 25.808 V0.2.3 (Oct. 2004), Technical Report $3^{rd}$ Generation Partnership Project; Technical Specification Group Radio Access Network; FDD Enhanced Uplink; Physical Layer Aspects (Release 6).

(Continued)

Primary Examiner — Charles Appiah
Assistant Examiner — Jaime Holliday
(74) Attorney, Agent, or Firm — Sughrue Mion, PLLC (57) ABSTRACT

A transmission method for an uplink transport layer in a mobile communication network provided with a plurality of mobile stations, a plurality of base stations and a radio network controller includes the step of: each base station receiving and decoding a data packet from the mobile station; each base station storing a correctly-decoded data packet into a transmission queue and transmitting the correctly-decoded data packet to the radio network controller; the radio network controller updating reception status in accordance with the received data packets and sending the reception status to the plurality of base stations; and each base station updating the transmission queue in accordance with the received reception status.

18 Claims, 8 Drawing Sheets

(56) References Cited

FOREIGN PATENT DOCUMENTS

| | | |
|---|---|---|
| JP | 2001-268624 A | 9/2001 |
| JP | 2002-077230 A | 3/2002 |
| JP | 2004-007084 A | 1/2004 |
| JP | 2004-180158 A | 6/2004 |
| WO | WO 95/32594 A1 | 11/1995 |
| WO | 2005/022798 A1 | 3/2005 |
| WO | 2005/034561 A1 | 4/2005 |

OTHER PUBLICATIONS

3GPP TR 25.909 V0.1.0 (Sep. 2004) Technical Report $3^{rd}$ Generation Partnership Project; Technical Specification Group Radio Access Network; FDD Enhanced Uplink: UTRAN lub/lur Protocol Aspects (Release 6).

* cited by examiner

TRANSMISSION METHOD FOR UPLINK TRANSPORT LAYER

TECHNICAL FIELD

The present invention is related to uplink data packet transmission in a mobile communication network. More particularly, the present invention is related to a congestion reduction mechanism in a transport network by which base stations and a radio network controller are inter-connected together. Furthermore, the present invention is related to mobile communication employing diversity handover to enhance the capacity of a radio layer.

BACKGROUND ART

In typical cellular mobile communication, a mobile station (MS) sends an uplink data packet to a base station (BTS) transceiver over the air and the base station forwards the received packet toward a radio network controller (RNC) which then sends it to an appropriate upper layer, e.g. Internet. To support efficient uplink packet transmission from multiple mobile stations in the mobile communication network, the base station schedules the multiple mobile stations in order to maximize the total uplink data throughput of a cell while meeting a service requirement of individual mobile stations.

Figure 1:
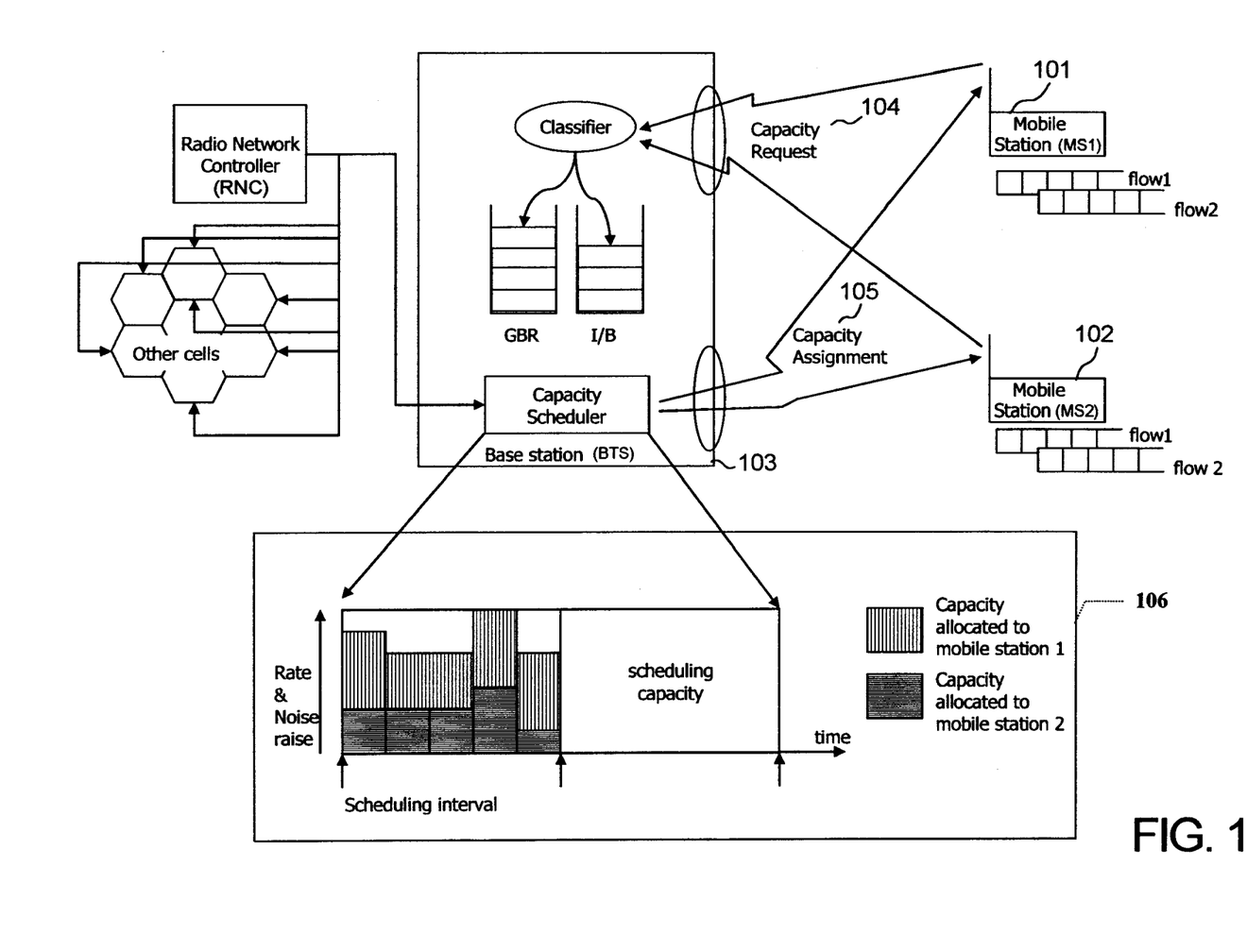
FIG. 1 is an illustration of a typical uplink data packet transmission in a mobile communication system.

As an example uplink data packet scheduling, FIG. 1 illustrates the Enhancement of Uplink Dedicated Channel (EDCH) in WCDMA (Wideband Code Division Multiple Access) mobile system. In the EDCH scheme, mobile stations (MS1, MS2) 101, 102 are transmitting multiple data flows (e.g. multiple data services) in uplink. The data transmission of uplink is controlled by base station scheduler 103. Uplink capacity request messages 104 and downlink capacity assignment messages 105 are exchanged between the mobile stations and the base station. Dynamic uplink radio resource allocation (in other words, uplink interference reshuffling) is implemented by closed loop capacity control among multiple mobile stations as shown in box 106 which illustrates uplink scheduling of mobile stations performed by a base station. Such scheduling is disclosed in, for example, each standard of: 3GPP TS 25.309 V6.0.0; 3GPP TR 25.808 V0.2.3; and 3GPP TR 25.909 V0.1.0.

In a most mobile communication system, there are two sub-systems to support a delivery of user data to designation, namely a radio layer and a transport layer. The radio layer performs a transmission of user data over the air between a mobile station and a base station while the transport layer carries out the delivery of the user data between the base station and other element of network, e.g., a radio network controller. Therefore, the overall network capacity is limited by both radio layer capacity and network layer capacity.

When a certain mobile station requests to establish uplink packet transmission, the radio network controller checks whether both radio layer and transport layer have sufficient available capacity to accommodate the mobile station. Furthermore, after the mobile station is admitted, a new radio link can be added when quality of the new radio link is sufficiently high compared to already added radio links. Note that the radio link refers to a wireless radio connection between a mobile station and a base station. Increased number of radio links improves the radio link capacity due to diversity handover gain.

In mobile communication, the radio layer capacity can be also improved by Automatic Request for Repeat (ARQ) which allows fast recovery of data transmitted over fast fading radio channel condition. This ARQ technique is more useful technology to transmit delay insensitive data such as interactive and background service than delay critical data such as voice service. A simple type of ARQ technology is used in an uplink transmission system such as Enhanced DCH (refer 3GPP TR 25.808 V0.2.3). Note that the mobile communication system such as Enhanced DCH technology uses the ARQ technique in conjunction with diversity handover technique, hence enabling even higher capacity gain of radio link capacity.

The standards of 3GPP ($3^{rd}$ Generation Partnership Project) cited in this description will be listed below:

[Non-patent Document 1] 3GPP TS 25.309 V6.0.0 (2004-09) Technical Specification $3^{rd}$ Generation Partnership Project; Technical Specification Group Radio Access Network; FDD Enhanced Uplink; Overall description; Stage 2 (Release 6);

[Non-patent Document 2] 3GPP TR 25.808 V0.2.3 (2004-10) Technical Report $3^{rd}$ Generation Partnership Project; Technical Specification Group Radio Access Network; FDD Enhanced Uplink; Physical Layer Aspects (Release 6); and

[Non-patent Document 3] 3GPP TR 25.909 V0.1.0 (2004-09) Technical Report $3^{rd}$ Generation Partnership Project; Technical Specification Group Radio Access Network; FDD Enhanced Uplink: UTRAN lub/lur Protocol Aspects (Release 6).

DISCLOSURE OF THE INVENTION

Problem to be Solved by the Invention

The problem of conventional technology of interest, such as Enhanced DCH technology, is that best radio layer capacity can be achieved by adding more good radio links (i.e., diversity handover gain) hence the transport layer should be able to support added traffic. If the capacity of the transport layer is not sufficient, then higher diversity handover gain at the radio layer cannot be allowed, hence reducing overall network capacity.

Figure 2:
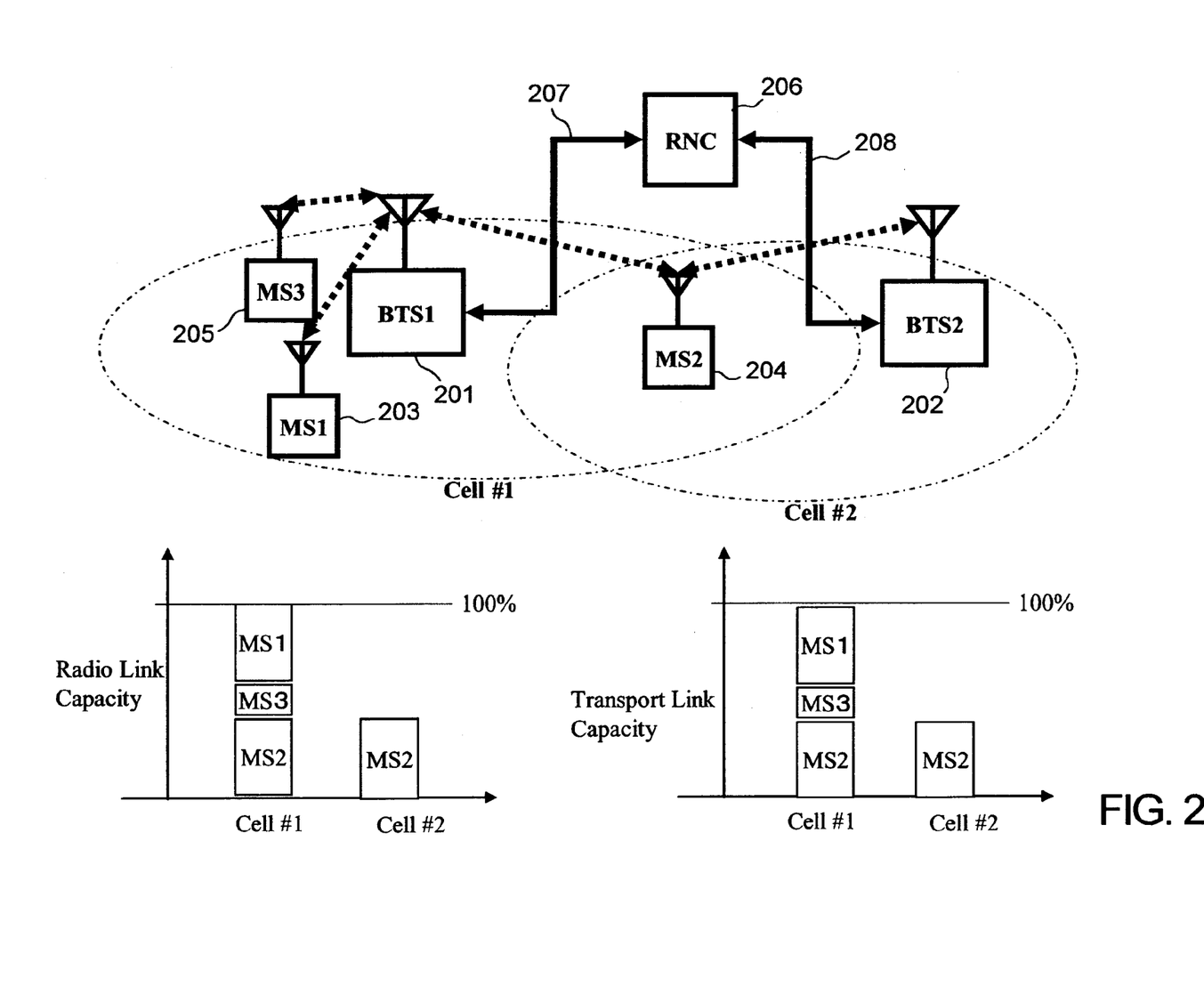
FIG. 2 is an illustration of diversity handover in a radio layer and congestion at a transport layer.

An illustration of aforementioned problem is given in FIG. 2. In this example, two base stations (BTS1, BTS2) 201, 202 are serving three mobile stations (MS1, MS2, MS3) 203, 204, 205 which transmit data in uplink. Radio network controller (RNC) 206 is controlling both base stations 201, 202 and mobile stations 203, 204, 205. Base station (BTS1) 201 manages cell #1 and base station (BTS2) manages cell #2. Both cells are partially overlapped to each other. Base station (BTS1) 201 is receiving data packets from three mobile stations while the base station (BTS2) 202 is receiving data packets from only mobile station (MS2) 204. Compared to mobile station MS1 and mobile station MS3, the mobile station MS2 is located in a soft handover region between the base stations hence reliability of data packet transmission from mobile station MS2 improved by diversity handover reception. Radio network controller (RNC) 206 receives all data packets transmitted by all mobile stations. More specifically, the packets from mobile station MS2 received by both base stations has to be combined at the radio network controller before delivery to the upper layer.

From this example, transport link 207 between base station BTS1 and radio network controller 206 suffers heavy traffic due to larger number of serving mobile stations. In fact, all three mobile stations in this example can be connected to both base stations hence increasing the radio layer diversity handover gain. Then transport layer 208 between base station BTS2 and radio network controller 206 will also suffer from the increased traffic to support the radio layer diversity handover gain. Without loss of generality, increasing radio layer diversity handover gain will incur higher bandwidth requirement for a transport layer.

The object of the present invention is to provide a method of reducing traffic congestion in a transport layer while maximizing radio layer diversity handover gain.

Means for Solving the Problem

The object of the present invention is achieved by a transmission method for uplink transport layer in a mobile communication network comprising a plurality of mobile stations, a plurality of base stations connected to the plurality of mobile stations, and a radio network controller connected to the plurality of base stations, the method comprising the steps of: transmitting a data packet to the plurality of base stations from the mobile station; the plurality of base stations receiving the transmitted data packet from the mobile station; the plurality of base stations decoding the received data packet; the plurality of base stations storing a correctly-decoded data packet into a transmission queue; transmitting data packet stored in the transmission queue to the radio network controller from the plurality of base stations; the radio network controller receiving the transmitted data packets from the plurality of base stations; the radio network controller updating reception status; sending the reception status to the plurality of base stations from the radio network controllers; the plurality of base stations receiving the reception status from the radio network controller; and the base station updating the transmission queue in response to the received reception status.

According to the present invention, the radio network controller may update the reception status based on the received data packets. One of (i) a next expected packet transmission sequence number after the radio network controller combines data packets transmitted from the plurality of base stations, (ii) a plurality of transmission sequence numbers of missing packets after the radio network controller combines the data packets transmitted from the plurality of base stations, and (iii) a plurality of transmission sequence numbers of packets received by the radio network controller may be used as the reception status, for example.

According to the present invention, the radio network controller may send the reception status to said plurality of base stations upon arrival of a data packet from the plurality of base stations. Alternatively, the radio network controller may periodically send the reception status to said plurality of base stations. Alternatively, the radio network controller sends said reception status to a certain base station in the plurality of base stations if congestion is detected from the certain base station.

Further, according to the present invention, the base station removes a data packet in the transmission queue when a predetermined condition is satisfied. At least one of (i) condition in which a transmission sequence number of the data packet is smaller than the next expected packet transmission sequence number, (ii) condition in which a transmission sequence number of the data packet does not belong to the plurality of missing transmission sequence numbers, and (iii) condition in which a transmission sequence number of the data packet belongs to the plurality of received transmission sequence numbers may be used as the such a predetermined condition, for example.

According to the present invention, congestion may be detected, for example, by time difference between arrival times of data packets with the same transmission sequence number from the plurality of base stations.

According to the present invention, the transport layer congestion can be reduced while maintaining the diversity handover gain at radio layer.

DESCRIPTION OF NUMERALS 101, 102, 203-205, 503: Mobile stations,
103: Base station scheduler,
104: Uplink capacity request message,
105: Downlink capacity assignment message,
201, 202, 501, 502: Base stations,
206: Radio network controller,
207, 208, 506-508: Transport links,
301: Uplink data transmission unit,
302: Uplink control information transmission unit,
303, 313, 401: Uplink receiver units,
304, 404, 405: Downlink ARQ information receiver units,
305: Downlink ARQ information transmission unit,
306, 406, 407: Transport link transmission queue units,
307, 408, 409: Transport link transmission control units,
308, 410: Combining queue units,
309: Transport link receiver unit,
310: Transmission link,
402, 403: Uplink transport links,
412, 413: Downlink reception status information,
504: Serving radio network controller, and
505: Drifting radio network controller.

BEST MODE FOR CARRYING OUT THE INVENTION

The preferred embodiments of the present invention will be described with reference to the accompanying drawings.

Figure 3:
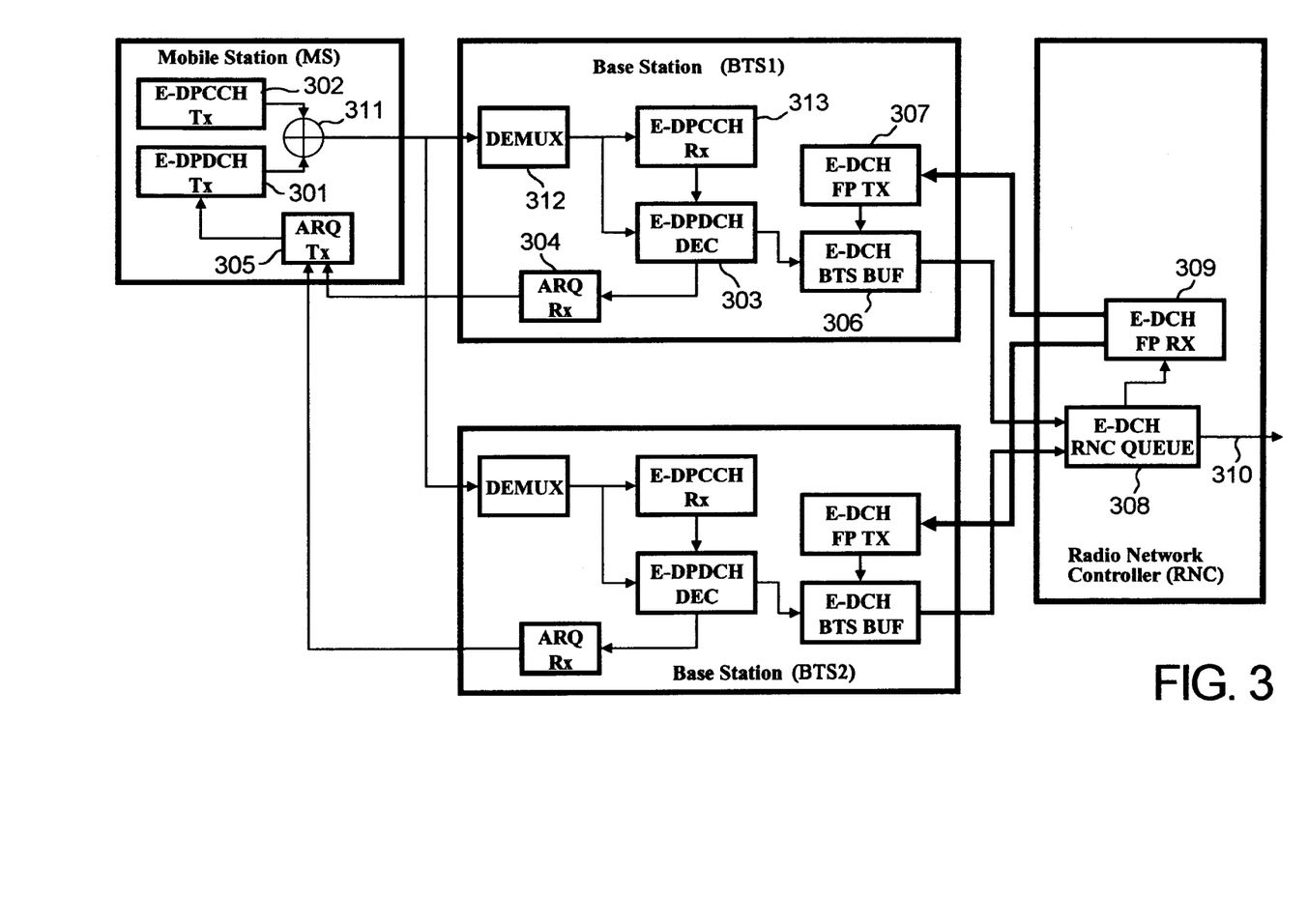
FIG. 3 is a block diagram of the system according to the first embodiment of the present invention.

First Embodiment:

FIG. 3 illustrates a system according to the first embodiment. The system is provided with a mobile station (MS) connected to two base stations (BTS1, BTS2) while a radio network controller (RNC) is connected to the base stations. This system diagram is also applicable for the case when a mobile station is connected to more than two base stations. More general speaking, a set of base stations in a network is defined as connected set of base stations for a given mobile station. Furthermore, each mobile station in the network may have a different connected set of base stations. Although one mobile station is illustrated in FIG. 3, the network may have a plurality of mobile stations.

The mobile station (MS) has uplink data transmission unit (E-DPDCH Tx) 301 for transmitting a data packet to the base station, uplink control information transmission unit (E-DPCCH Tx) 302 for transmitting control information to the base station, downlink ARQ information transmission unit (ARQ Tx) 305 for controlling re-transmission of data packet based on ARQ feedback from the base station, and multiplexer 311 for multiplexing the data packet from transmission unit 301 and the control information from transmission unit 302.

Each of the base stations (BTS1, BTS2) has uplink receiver unit (E-EPDCH DEC) 303 for receiving and decoding the data packet from the mobile station, downlink ARQ information receiver (ARQ Rx) 304 for sending ARQ feedback to the mobile station, transport link transmission queue unit (E-DCH BTS BUF) 306 for storing data packet which is to be transmitted to the radio network controller, transport link transmission control unit (E-DCH FP TX) 307 for forwarding the stored data packet by frame protocol, demultiplexer (DE-MUX) 312 for demultiplexing the data packet and control information transmitted from the mobile station, and uplink receiver unit (E-EPCCH Rx) 313 for receiving the control information from the mobile station. Demultiplexer 312 delivers the demultiplexed data packet to uplink receiver unit 303 and the demultiplexed control information to uplink receiver unit 313.

The radio network controller (RNC) has combining queue unit (E-DCH RNC QUEUE) 308 for receiving sent data packets from two base stations and combining the data packets, and transport link receiver unit (E-DCH FP RX) 309 for sending reception status to both base stations. Combining queue unit 308 is connected to transmission link 310 to an upper layer.

As an overall outline, the uplink data packet transmission procedure from the mobile station to the radio network controller is conducted as follows:

First, the mobile station transmits a data packet with associated control information to two base stations. At this time, the data packet from uplink data transmission unit 301 and the control information from uplink control information transmission unit 302 are multiplexed by multiplexer 311 and multiplexed data is transmitted to each base station.

Then both base stations receive the data from the mobile station and demultiplexer 312 demultiplexes the received data into the data packet and the control information. In each of the base stations, uplink receiver unit 303 receives and decode the data packet, downlink ARQ information receiver unit 304 sends ARQ feedback to the mobile station based on the received data packet. Then, the mobile station receives the ARQ feedback. If none of received ARQ feedback is positive, downlink ARQ information transmission unit 305 in the mobile station causes uplink data transmission unit 301 to retransmit the same data packet, otherwise uplink data transmission unit 301 continues to transmits new data packet.

Both base stations send correctly decoded data packets to the radio network controller by storing the data packet into transmission queue units 306, and transmission link transmission control units of both base stations forward stored data packet by frame protocol 307.

In the radio network controller, combining queue unit 308 receives sent data packets from two base stations and combines data packets, and transport link receiver unit 309 sends reception status to both base stations. Finally, combining queue unit 308 sends the combined data packets to an upper layer via transmission link 310.

More specifically, detail procedures in the mobile station, the base stations and the radio network controller will be described.

Figure 4:
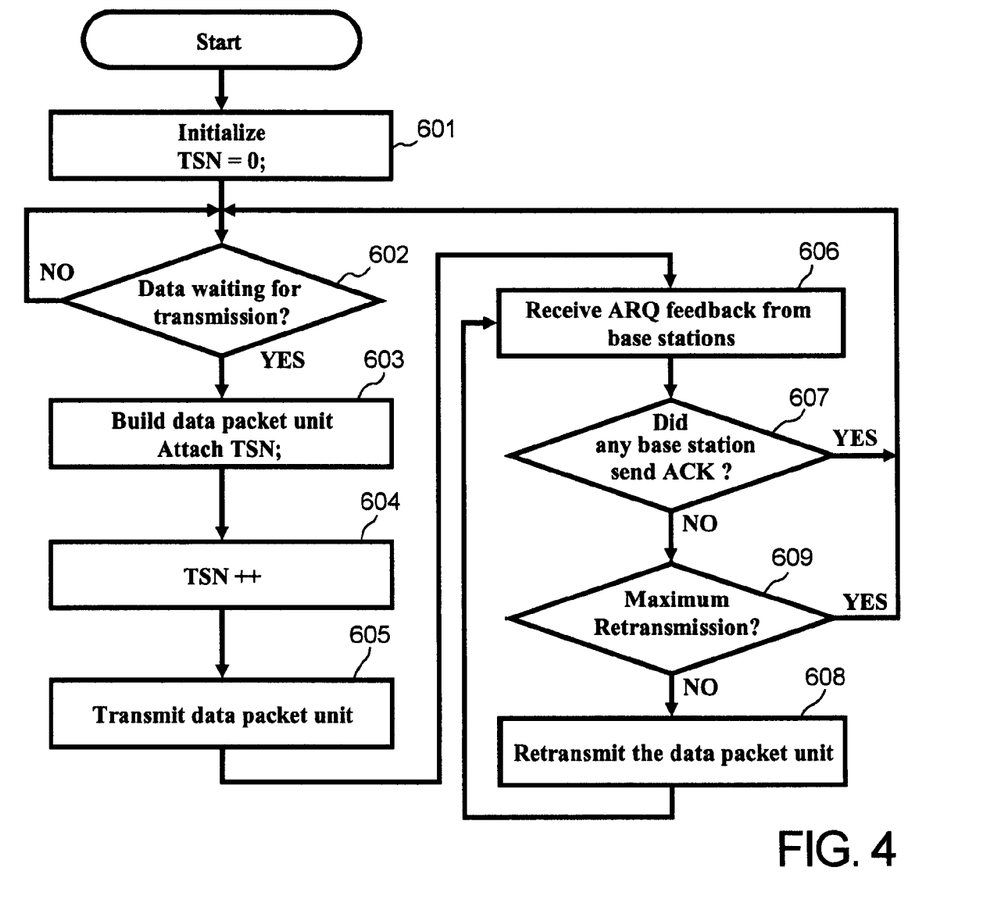
FIG. 4 is a flowchart illustrating a detail procedure in the mobile station.

FIG. 4 illustrates the detail procedure of the mobile station.

In the mobile station, transmission sequence number (TSN) is firstly initialized to 0 at step 601, and it is checked whether data waiting for transmission exists or not at step 602. If the data to be transmitted exists, the data packet with attached transmission sequence number (TSN) is built at step 603, the TSN is incremented at step 604, and the data packet is sent to the all connected set of base station at step 605.

After the transmission of the data packet, the mobile station receives and detects ARQ feedback information from the connected set of base stations at step 606, and checks whether at least one base station sent ACK or not at step 607. If any of detected ARQ feedback information is positive, i.e. at least one base station in the connected set succeeded to receive the sent data packet, then the control goes back to step 602 to continue to transmit a new data packet. If all detected ARQ feedback information are negative at step 607, i.e. all base stations in the connected set failed to receive the sent data packet, then the mobile station retransmits the same data packet at step 608. In step 609, the number of retransmission is compared with the predetermined maximum value. If the number of retransmission reached maximum number of retransmission, the retransmission is discarded and the control goes back to step 602.

Figure 5:
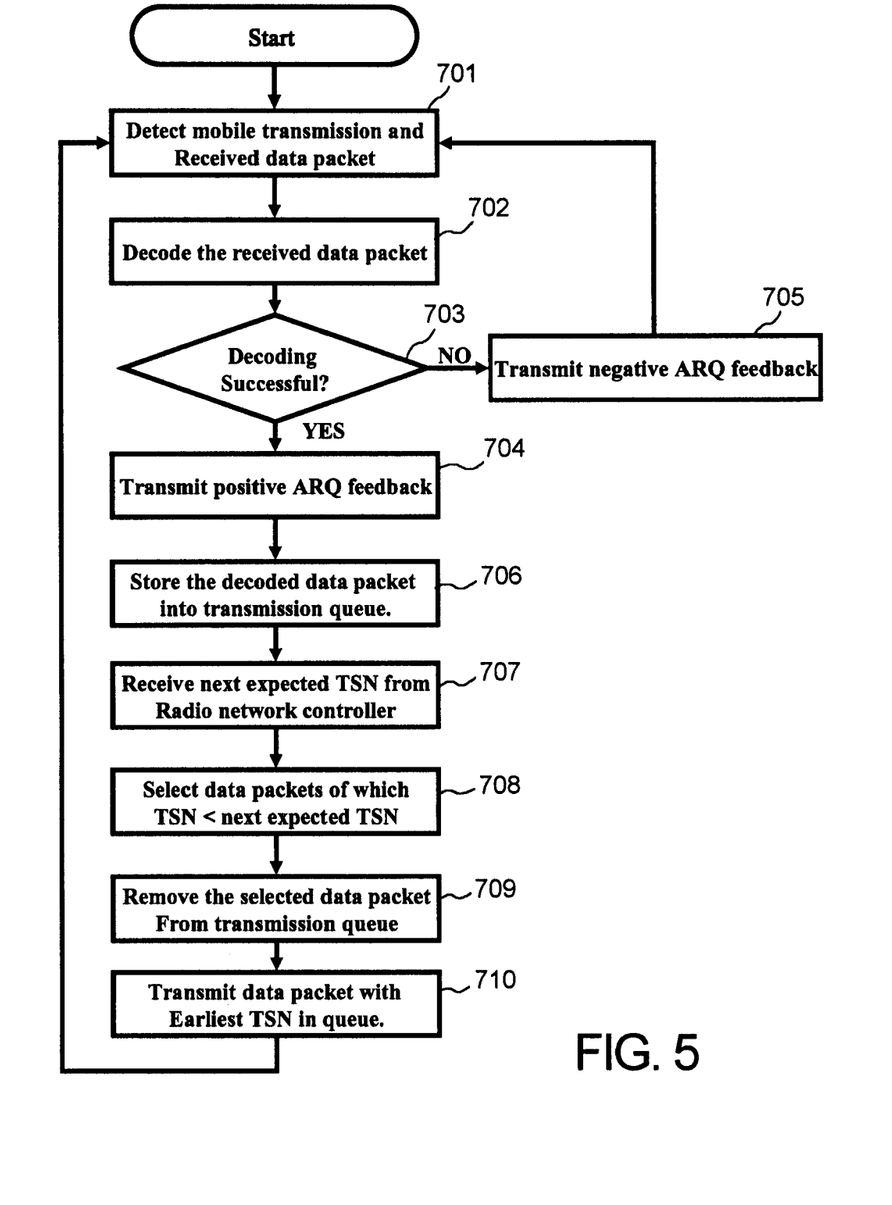
FIG. 5 is a flowchart illustrating a detail procedure in the base station.

FIG. 5 illustrates a detail procedure of each base station in the connected set.

Each base station receives the sent data packet transmitted from the connected mobile station at step 701, decodes the received data packet at step 702, and checks whether the decoding is successful or not. If the decoding is unsuccessful, the base station sends negative ARQ feedback information to base station at step 705 and the control goes back to step 702. If the decoding is successful at step 703, then the base station sends positive ARQ information at step 704, stores the decoded data packet into the transmission queue of transport layer at step 706, and receives the next expected TSN from radio network controller at step 707. After reception of the next expected TSN, the base station selects a set of data packets at transmission queue whose TSN is smaller than the received next expected TSN at step 708, removes the selected set of data packets from transmission queue at step 709, and transmits stored data packet with smallest TSN at transmission queue to radio network controller at step 710. Then the control goes back to step 710.

Figure 6:
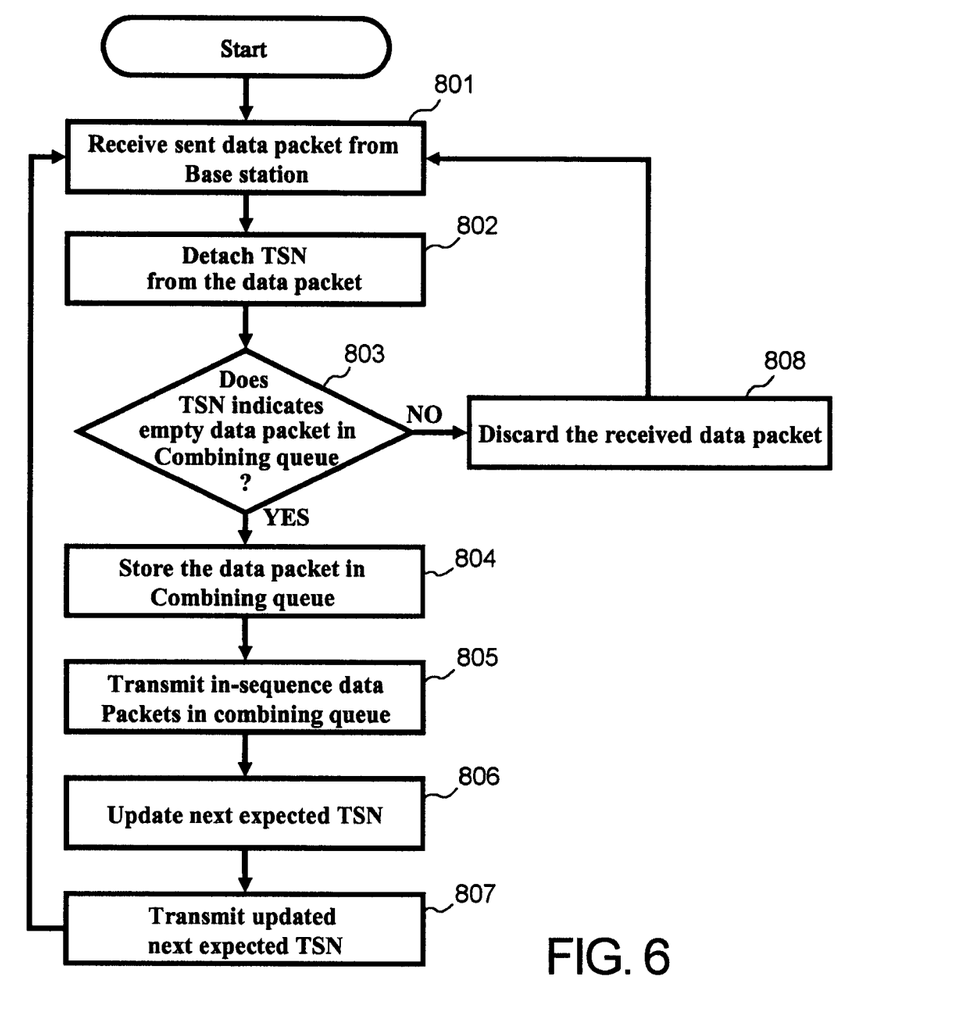
FIG. 6 is a flowchart illustrating a detail procedure in the radio network controller.

FIG. 6 illustrates a detail procedure of the radio network controller.

The radio network controller receives each data packet sent by each base station in the connected set of base stations at step 801, detaches the TSN from the data packet at step 802, and checks the attached TSN of data packet at step 803. If TSN indicates empty data packet in the combining queue at step 803, the radio network controller stores the data packet into the combining queue with location indicated by TSN at step 804, and otherwise, discards the data packet at step 808 to go back to step 801.

After step 804, the radio network controller delivers in-sequence data packets to an upper layer where data packets are in-sequence defined as continuous sequence of TSN with non-empty data packets in the combining queue at step 805, updates the next expected TSN indicating smallest TSN with empty data packet in the combining queue at step 806, and sends the updated next expected TSN to the connected set of base stations at step 807. Then the control goes back to step 801.

Based on the detailed procedures described above, FIG. 7 illustrates an example of sequential procedure between the mobile station, base stations and radio network controller, using a particular sequence of events in the radio layer and transport layer. In this sequence, the base station BTS1 and base station BTS2 are receiving data packets from a mobile station by their uplink receiver units 401. Here, uplink transport link 402 between the base station BTS1 and the radio network controller is narrow band and/or it also suffers heavy traffic due to other mobile stations connected to the base station BTS1, while uplink transport link 403 between the base station BTS2 and the radio network controller is wide band and/or there is light traffic due to other mobile stations connected to the base station BTS2. The mobile station has transmitted data packets of TSN={#101, #102, #103, #104, #105, #106}, and it receives {ACK, ACK, NACK, ACK, ACK, ACK} from base station BTS1 through downlink ARQ information receiver unit 404 of the base station BTS1 and {NACK, ACK, ACK, ACK, ACK, ACK} from base station BTS2 through downlink ARQ information receiver unit 405 of the base station BTS2

Figure 7:
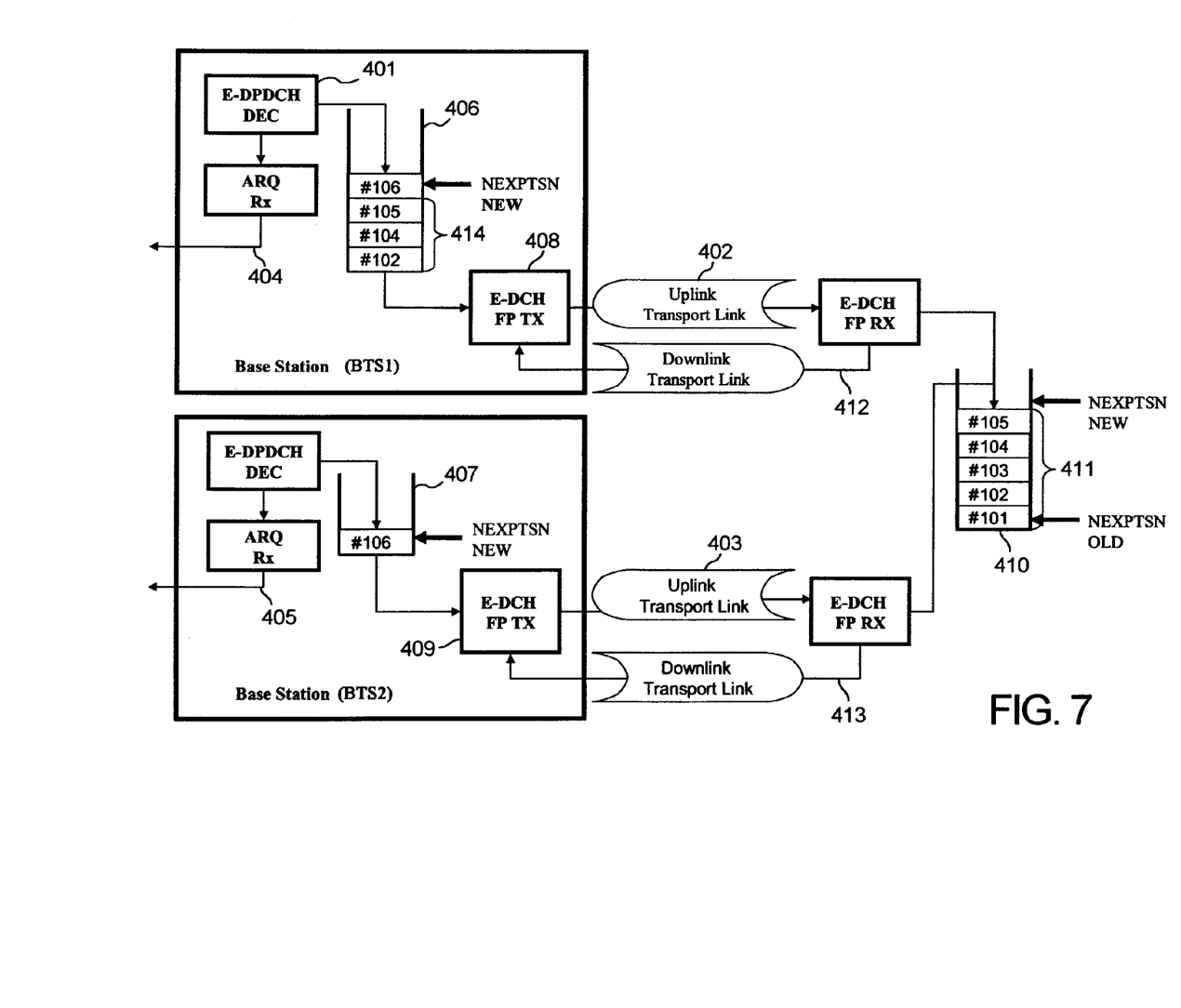
FIG. 7 is an illustration of transport layer congestion reduction according to the first embodiment.

Then the data packets of TSN={#101, #102, #104, #105, #106} are received by base station BTS1 and stored into transport link transmission queue unit 406, and data packets of TSN={#102, #103, #104, #105, #106} are received by base station BTS2 and stored into the transport link transmission queue unit. Data packet of TSN={#101} is transmitted to the radio network controller from base station BTS1 and data packets of TSN={#102, #104, #105, #106} are waiting for transmission at the queue by transport link transmission control unit 408. Similarly, data packets of TSN={#102, #103, #104, #105} are transmitted to radio network controller from base station BTS2 by transport link transmission control unit 409.

The radio network controller receives, at combining queue unit 410, data packet of TSN={#101} from base station BTS1 at later time than data packets of TSN=({190 102, #103, #104, #105} from base station BTS2. Upon the reception of the data packet of TSN={#101}, the radio network controller transmits data packets of TSN={#101, #102, #103, #104, #105} to an upper layer and it sets NEXPTSN equal to #106. In FIG. 7, queue combining unit 410 stores data packets of TSN={#101, #102, #103, #104, #105} as data packets 411 ready to be transmitted in the upper layer.

The radio network controller then sends NEXPTSN=#106 to both base station BTS1 and base station BTS2 as downlink reception status information 412, 413 from the radio network controller to the base stations. Upon reception of NEXPTSN=#106, base station BTS1 discards data packets 414 of TSN={#102, #104, #105} from its transport queue 406 and starts to transmit data packet of #106.

According to the present embodiment, the transmission of unnecessary data packets from the base stations to the radio network controller is avoided. For example, the base station BTS1 discarded the data packets of TSN={#102, #104, #105} in the example shown in FIG. 7. Hence transport layer traffic between the radio network controller and base station BTS1 is reduced. Data packets from both base stations are combined at the radio network controller, hence keeping the diversity handover gain at radio layer. In FIG. 7, the data packet of TSN={#101} is transmitted to the radio network controller from base station BTS1 while data packets of TSN={#102, #103, #104, #105} are transmitted to radio network controller from base station BTS2. The radio network controller then combines data packets from both base stations and transmits data packets of TSN={#101, #102, #103, #104, #105} to the upper layer.

Figure 8:
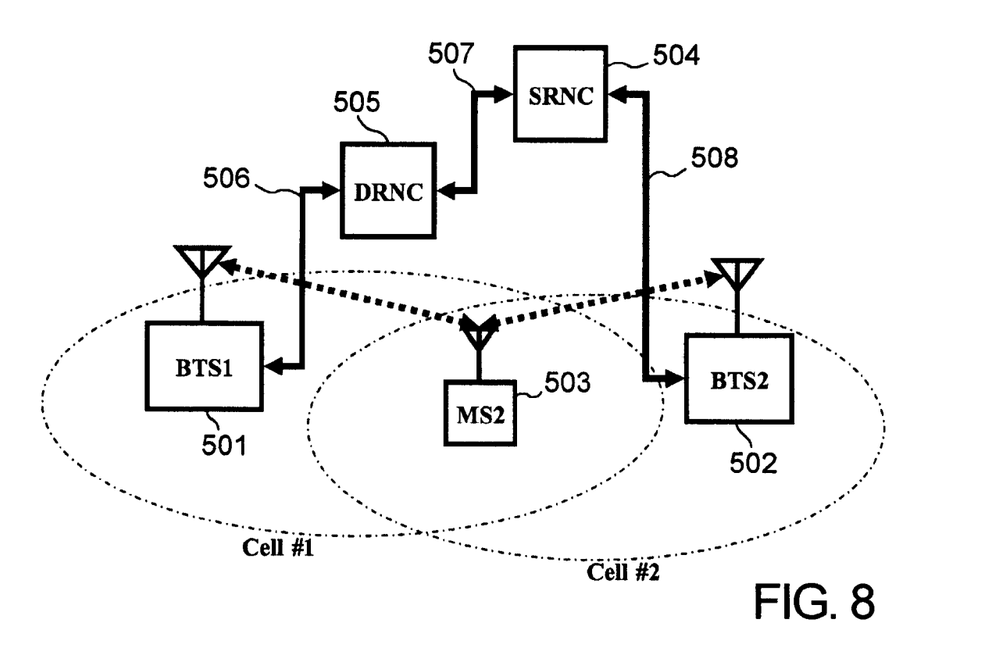
FIG. 8 is a block diagram of the system according to the second embodiment of the present invention.

Second Embodiment:

FIG. 8 is a diagram of the system according to the second embodiment. The mobile communication network shown in FIG. 8 comprises mobile station (MS2) 503, two base stations (BTS1, BTS2) 501, 502 and two radio network controllers (DRNC, SRNC) 504, 505. Although one mobile station is illustrated in FIG. 8, the network may have a plurality of the mobile stations.

The serving radio network controller (SRNC) 504 is a radio network controller controlling the base station (BTS2) 508. The serving radio network controller receives the data packet, from both base stations, sent by the mobile station. The drifting radio network controller (DRNC) 505 is a radio network controller controlling base station BTS1. The drifting radio network controller receives data packets from the base station BTS1 and forwards them to serving radio network controller 504 of the mobile communication network. Three transport links 506 to 508 are established between the base stations and serving radio network controller 504 such that transport link 506 is arranged between base station BTS1 and drifting radio network controller 505, transport link 508 is arranged between base station BTS2 and serving radio network controller 504, and transport link 507 is arranged between drifting radio network controller 505 and serving radio network controller 504.

The aforementioned detail procedures of the mobile station, base station and serving radio network controller, described in the first embodiment, are applied to the second embodiment. In addition, a detail procedure of drifting radio network controller 505 is described as follows:

Drifting radio network controller 505 receives the data packets from base stations under the control by drifting radio network controller 505. For each data packet received, drifting radio network controller 505 identifies the serving radio network controller, forwards the data packets to the identified serving radio network controller. Then drifting radio network controller 505 receives reception statuses from a plurality of serving radio network controllers. Drifting radio network controller 505 identifies the associated base station for each reception status received, and forwards the received reception status to the identified base station.

The second embodiment inherits the benefit of the first embodiment such that the traffic at both transport links 506, 508 between the base stations and the radio network controllers is reduced by interaction between serving radio network controller 504 and base stations. Hence, the proposed invention also reduces the traffic at transport link 507 between the serving and drifting radio network controllers In each embodiment described above, the radio network controller uses NEXPTSN, that is, a next expected packet transmission sequence number after the radio network controller combines the data packets transmitted from the plurality of base stations, as the reception status for each base station. However, the reception status which can be used is not limited to this. A plurality of transmission sequence numbers of missing packets after the radio network controller combines the data packets transmitted from the plurality of base stations, or a plurality of transmission sequence numbers of packets received by the radio network controller may be used as the reception status can be also used as the reception status, for example.

In addition, although the radio network controller may send the reception status to said plurality of base stations upon arrival of a data packet from the plurality of base stations in the example describe above, it may periodically send the reception status to said plurality of base stations, instead. Alternatively, the radio network controller sends said reception status to a certain base station in the plurality of base stations if congestion is detected from the certain base station. The congestion may be detected, for example, by time difference between arrival times of data packets with the same transmission sequence number from the plurality of base stations.

In the aforementioned embodiments, the base station removes a data packet in the transmission queue when a transmission sequence number of the data packet is smaller than NEXPTSN. In addition, the base station may removes a data packet in the transmission queue when a transmission sequence number of the data packet does not belong to the plurality of missing transmission sequence numbers, or when a transmission sequence number of the data packet belongs to the plurality of received transmission sequence numbers.

The invention claimed is:

1. A transmission method for an uplink transport layer in a mobile communication network comprising a plurality of mobile stations, a plurality of base stations connected to said plurality of mobile stations, and a radio network controller connected to said plurality of base stations, each of said plurality of base stations including a transmission queue, the method comprising:
transmitting a data packet, to which a transmission sequence number is attached, to said plurality of base stations from said mobile station, the transmission sequence number being increased on a packet-by-packet basis;
receiving the transmitted data packet from said mobile station at said plurality of base stations;
decoding the received data packet at said plurality of base stations;
storing a correctly decoded data packet into said transmission queue at each of said plurality of base stations;
transmitting the data packet stored in said transmission queue to said radio network controller from said plurality of base stations;
receiving said transmitted data packet from said plurality of base stations at said radio network controller;
updating reception status at said radio network controller;
sending said reception status to said plurality of base stations from said radio network controller;
receiving said reception status from said radio network controller at a first base station from among said plurality of base stations; and
updating, at said first base station, said transmission queue of the first base station in response to said received reception status,
wherein said reception status is a next expected packet transmission sequence number generated , by said radio network controller, after combining data packets transmitted from said plurality of base stations, and
wherein said updating of the transmission queue of the first base station includes the first base station removing a data packet stored in its transmission queue if the transmission sequence number of the data packet is smaller than said next expected packet transmission sequence number.

2. The method according to claim 1, wherein said radio network controller sends said reception status, to said plurality of base stations, at arrival of a data packet from said plurality of base stations.

3. The method according to claim 1, wherein said radio network controller sends said reception status periodically to said plurality of base stations.

4. The method according to claim 1, wherein said radio network controller sends said reception status to a certain base station in the said plurality of base stations if congestion is detected from said certain base station.

5. The method according to claim 4, wherein congestion is detected by time difference between arrival times of data packets with same transmission sequence number from said plurality of base stations.

6. The method according to claim 1, wherein congestion is detected by time difference between arrival times of a data packet with same transmission sequence number from said plurality of base stations.

7. A transmission method for an uplink transport layer in a mobile communication network comprising a plurality of mobile stations, a plurality of base stations connected to said plurality of mobile stations, and a radio network controller connected to said plurality of base stations, each of said plurality of base stations including a transmission queue, the method comprising:
transmitting a data packet to said plurality of base stations from said mobile station;
receiving the transmitted data packet from said mobile station at said plurality of base stations;
decoding the received data packet at said plurality of base stations;
storing a correctly decoded data packet into the transmission queue at each of said plurality of base stations;
transmitting the data packet stored in said transmission queue to said radio network controller from said plurality of base stations;
receiving said transmitted data packet from said plurality of base stations at said radio network controller;
updating reception status at said radio network controller;
sending said reception status to said plurality of base stations from said radio network controller;
receiving said reception status from said radio network controller at said plurality of base stations; and
updating, at a first base station from among said plurality of base stations, said transmission queue of the first base station in response to said received reception status,
wherein said reception status comprises a plurality of transmission sequence numbers corresponding to missing data packets, the plurality of transmission sequence numbers generated, by said radio network controller, after combining data packets transmitted from said plurality of base stations, and
wherein said updating of the transmission queue of the first base station includes the first base station removing a data packet stored in its transmission queue unless a transmission sequence number of the data packet is included in said plurality of transmission sequence numbers corresponding to missing data packets.

8. The method according to claim 7, wherein said radio network controller sends said reception status, to said plurality of base stations, at arrival of a data packet from said plurality of base stations.

9. The method according to claim 7, wherein said radio network controller sends said reception status periodically to said plurality of base stations.

10. The method according to claim 7, wherein said radio network controller sends said reception status to a certain base station in the said plurality of base stations if congestion is detected from said certain base station.

11. The method according to claim 10, wherein congestion is detected by time difference between arrival times of data packets with same transmission sequence number from said plurality of base stations.

12. The method according to claim 7, wherein congestion is detected by time difference between arrival times of a data packet with same transmission sequence number from said plurality of base stations.

13. A transmission method for an uplink transport layer in a mobile communication network comprising a plurality of mobile stations, a plurality of base stations connected to said plurality of mobile stations, and a radio network controller connected to said plurality of base stations, each of said plurality of base stations including a transmission queue, the method comprising:

transmitting a data packet, to which a transmission sequence number is attached, to said plurality of base stations from said mobile station, the transmission sequence number being increased on a packet-by-packet basis;

receiving the transmitted data packet from said mobile station at said plurality of base stations;

decoding the received data packet at said plurality of base stations;

storing a correctly decoded data packet into the transmission queue at each of said plurality of base stations;

transmitting the data packet stored in said transmission queue to said radio network controller from said plurality of base stations;

receiving said transmitted data packet from said plurality of base stations at said radio network controller;

updating reception status at said radio network controller;

sending said reception status to said plurality of base stations from said radio network controller;

receiving said reception status from said radio network controller at said plurality of base stations; and updating, at a first base station from among said plurality of base stations, said transmission queue of the first base station in response to said received reception status, wherein said reception status comprises a plurality of transmission sequence numbers of packets received by said radio network controller, and wherein said updating of the transmission queue of the first base station includes the first base station removing a data packet stored in its transmission queue if a-the transmission sequence number of the data packet is included in said plurality of received transmission sequence numbers.

14. The method according to claim 13, wherein said radio network controller sends said reception status, to said plurality of base stations, at arrival of a data packet from said plurality of base stations.

15. The method according to claim 13, wherein said radio network controller sends said reception status periodically to said plurality of base stations.

16. The method according to claim 13, wherein said radio network controller sends said reception status to a certain base station in the said plurality of base stations if congestion is detected from said certain base station.

17. The method according to claim 16, wherein congestion is detected by time difference between arrival times of data packets with same transmission sequence number from said plurality of base stations.

18. The method according to claim 13, wherein congestion is detected by time difference between arrival times of a data packet with same transmission sequence number from said plurality of base stations.

* * * * *